Sept. 16, 1958  T. E. QUICK  2,851,853
THRUST AUGMENTATION MEANS FOR JET PROPULSION ENGINES
Filed Dec. 28, 1953

*INVENTOR.*
*THOMAS E. QUICK*
BY
John H. Widdowson
*ATTORNEY*

2,851,853

THRUST AUGMENTATION MEANS FOR JET PROPULSION ENGINES

Thomas E. Quick, Wichita, Kans.

Application December 28, 1953, Serial No. 400,621

6 Claims. (Cl. 60—35.6)

This invention relates to propulsion. In a more specific aspect, this invention relates to jet propulsion and to new engines therefor. In a still more specific aspect, this invention relates to means for augmenting the thrust of jet propulsion engines used to propel aircraft, particularly those engines wherein turbine means is used to drive a compressor to compress air and/or turn a propeller or fan to move air. In still another specific aspect, this invention relates to means for efficiently utilizing the energy of the high velocity exhaust gases from the combustion chambers of a jet propulsion engine, particularly a turbo-jet type engine, to energize air of much greater mass than the gases from the combustion chamber to obtain a greater reaction of thrust therefrom, and to cool the gases from the combustion chambers prior to contact with the blades of the turbine.

It is well known in the art that turbo-jet engines are inefficient at relatively low altitudes up to 25,000 feet and speeds in the range of 125 to 500 miles per hour. These turbo-jet engines are jet propulsion engines exhausting a stream of gases at high velocity, the turbo-jet utilizing only a small portion of the energy from the gases exiting from the combustion chambers to turn a turbine linked to a compressor which compresses inlet air prior to introduction into the combustion chambers. Normally the turbo-jet engines do not have means therewith to utilize any of the kinetic energy in the exhaust gases. Turbo-prop jet engines and ducted fan jet engines are known in the art, both being engine means to utilize the energy in the gases exiting from the combustion chambers of the jet engine. The turbo-prop engine functions similarly to the turbo-jet engine, differing primarily in that the turbo-prop engine has greater gas turbine means having more stages, the gas turbine being linked to a propeller which it drives. The ducted-fan jet engine has an annular bypass passageway for air all around the turbo-jet engine wherein revolve blades of a fan mounted to the front and linked to the gas turbine of the jet engine, the exhaust gases from the jet engine and air bypassed therearound intermixing to the rear near the point of hot gas exhaust of the jet engine. The turbo-prop and ducted-fan jet engines are more efficient than the turbo-jet engines. However, both the turbo-prop and ducted-fan engines utilize expensive moving mechanical equipment to gain efficiency. This has been found to be disadvantageous and a continual source of difficulty. Such engines are no better than piston type engines in regard to relative freedom from mechanical difficulty. In addition, in the turbo-jet, turbo-prop and ducted-fan engines, the combustion gases from the combustion chambers directly contact the turbine blades, that is, the contact is made while the gases are very hot. This requires expensive alloys for the turbine blades which have to withstand extremely high temperatures.

I have invented thrust augmentation means for engines employing a propulsive jet, particularly turbo-jet type engines. The means of my invention is hollow propulsive cases, preferably hollow, frustum-like members mounted on the engine between the combustion chambers and the turbine to preferably encompass at least the rear end portion of the combustion chambers, the propulsive cases forming annular fluid openings with the combustion chambers. The hollow, frustum-like members extend and converge rearwardly of the combustion chambers, it being preferred to use a plurality of such frustum-like members on each combustion chamber with additional propulsive members forming annular fluid openings with each other. In operation with the means of my invention mounted on the combustion chambers of the new engines of my invention, a relatively large mass of air from the atmosphere enters the annular fluid openings and has its velocity increased by contacting and mixing with the gases from the combustion chambers, which exhaust from the combustion chambers at high velocity. The gases from the combustion chambers exhaust air from within the hollow, frustum-like members. This results in a drop in pressure within the frustum-like members, giving rise to a pressure differential between the outside and inside thereof. Since the outside is at higher pressure, a force is exerted to propel the aircraft wherein the engine of my invention is mounted. The air entering the annular fluid openings during operation is at a much lower temperature than the combustion gases from the combustion chambers, and upon mixing, the resulting gaseous mixture is substantially lower in temperature than the temperature of the combustion gases. Only these relatively cool gases contact the turbine blades.

The thrust augmentation means and the thrust augmented jet propulsion engines of my invention have many advantages. They are highly efficient, economical to construct and operate, dependable, require relatively low cost materials of construction which last longer due to cooling of combustion gases, this being particularly true of the turbine and its blades, and the engines of my invention eliminate the usual frictional losses while very efficiently utilizing the kinetic energy of the propulsive jet gases from the combustion chambers. The means of my invention allows for near perfect mixing of the propulsive jet gases from the combustion chambers and atmospheric air which is energized, and this is accomplished with no moving parts such as are utilized in turbo-prop and ducted-fan engines. In particular, the thrust augmentation means of my invention makes the turbo-jet type engine practical, efficient and economical to operate at relatively low altitudes and speeds, such altitude and speed conditions being desirable in many types of aircraft such as air transports for persons and/or material, training planes, observation planes, etc.

It is an object of my invention to provide new propulsive means and method.

It is another object of my invention to provide new thrust augmentation means for engines employing a propulsive jet.

It is still another object of my invention to provide means to harness the kinetic energy of the high velocity exhaust gases from the combustion chambers of a jet engine and to convert such energy into additional upstream thrust.

It is still a further object of my invention to provide means which increase the thrust of engines employing a propulsive jet, particularly turbo-jet engines, for efficiently utilizing the energy in the high velocity exhaust gases from the combustion chambers to energize a larger mass of atmospheric air in order to obtain a greater reaction or thrust therefrom, and resulting in cooling such gases prior to contact of the resulting mixture with the blades of the turbine.

Still another object of my invention is to provide thrust augmentation means to simply, efficiently and inexpensively accomplish the last-named object without the use of large, inefficient, expensive and heavy equipment, including reduction gearing and other moving parts as is required with turbo-propellers and ducted-fans.

It is still another object of my invention to provide means for rapidly equalizing the velocity of two fluid streams of widely different velocities within propulsive case means, pressure differential across the wall of the case means resulting from the lowering of pressure within the case means being used to propel an object, particularly an aircraft, and to provide that such means result in cooling one of such streams.

Other objects and advantages of my invention will become apparent to one skilled in the art upon reading this disclosure.

Drawings accompany and are a part of this disclosure. The drawings depict preferred specific embodiments of my invention, and it is to be understood that such are not to unduly limit the scope of my invention.

Fig. 1 of the drawings is a longitudinal view partly cut away and partly in cross section of a preferred specific embodiment of the new thrust augmented jet engine of my invention.

Figure 1:
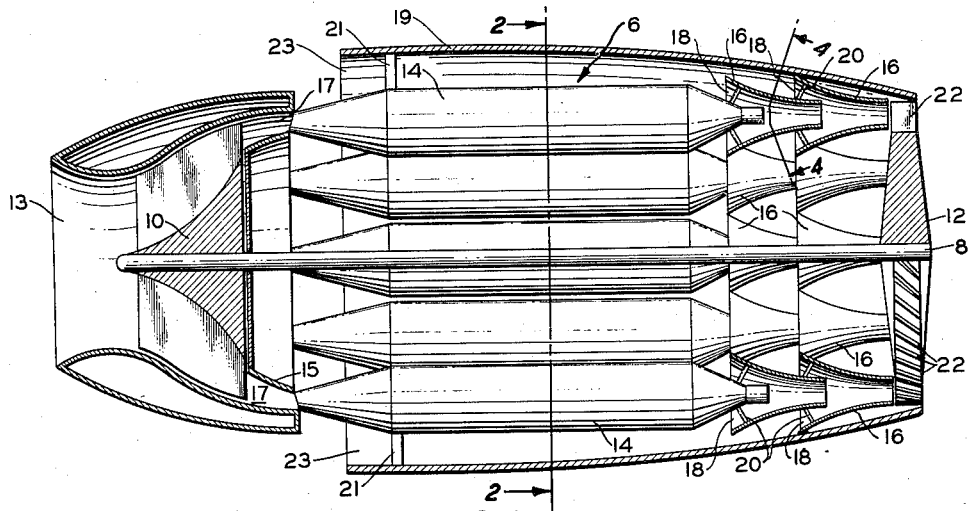

Following is a discussion and description of the thrust augmented jet propulsion engine and augmentation means of my invention. In such discussion and description reference is made to the drawings whereon the same reference numerals are used to indicate the same or similar structure or apparatus. It is to be understood that such discussion and description is not to unduly limit the scope of my invention.

Engine 6 has a drive shaft 8 on which a rotary compressor 10 is mounted in an end portion and on which a turbine 12 is mounted in the other end portion. A stationary housing or cowling 13 surrounds compressor 10. Housing 13 and shield member 15 form an annular conduit 17 for passing compressed air into combustion chambers 14. Elongated combustion chambers 14 are spaced from and mounted around shaft 8, and hollow frusto-conodial members 16 are mounted on the rear end portion of the combustion chambers 14 to form with the combustion chambers and with each other annular air inlet openings 18. An engine cowling or housing 19 preferably surrounds chambers 14, members 16 and turbine 12 from well forward on chambers 14 to the rear portion of turbine 12. Cowling 19 can be mounted in any suitable manner such as by struts 21 welded to members 14. Cowling 19 defines air passageways for atmospheric air to enter forward through annular opening 23, pass over and around chambers 14, enter annular openings 18, and pass between and around members 16 to contact turbine 12. If desired, cowling 19 can be welded to rear members 16 on the front edge thereof.

It is preferred that members 16 be hollow, frustoconoidal members whose cross sectional area continually decreases rearwardly so that fluid passing therethrough is continually accelerated. Any suitable number of members 16 on each combustion chamber 14 are used, and they can be mounted thereon in any suitable manner preferably co-axially by mounting means such as struts 20 welded to members 14 and 16.

Figure 2:
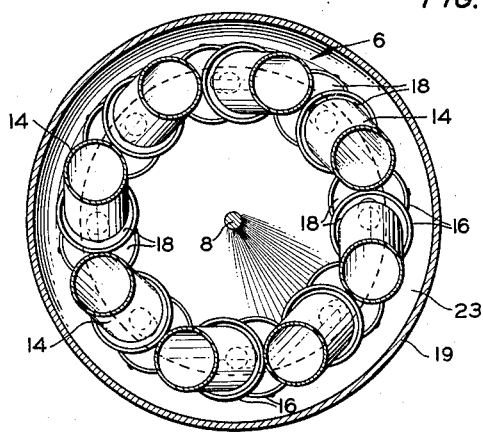
Fig. 2 is a view taken on line 2—2 of Fig. 1.
Figure 3:
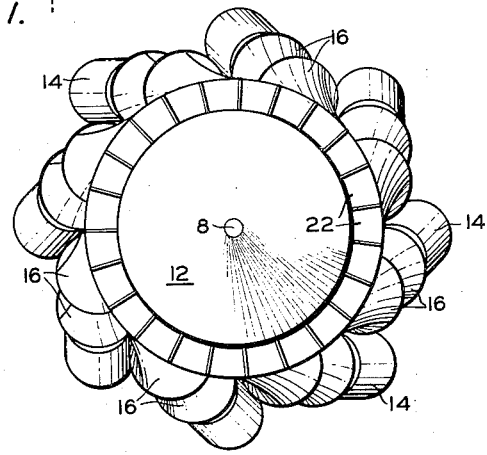
Fig. 3 is a rear end view showing another preferred specific embodiment of the new thrust augmented jet engine of my invention similar to the engine of Figs. 1 and 2, but differing in that the centrally located combustion chambers converge rearwardly.
Figure 4:
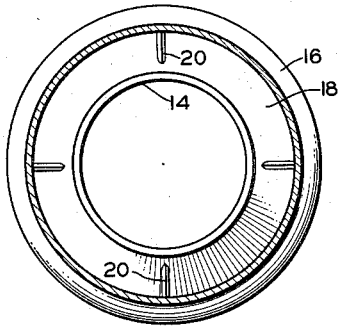
Fig. 4 is a view taken on line 4—4 of Fig. 1.

I have found it preferable to mount combustion chambers 14 in such manner that the longitudinal axis thereof are transverse the longitudinal axis of shaft 8 so that fluid discharged from the rearmost members 16 strikes the blades 22 of turbine 12 preferably nearly perpendicular thereto, as shown in Figs. 1 and 2, and I have found that such construction is very advantageous, because, no guide vanes before the turbine for combustion gases are necessary and the overall length of the engines of my invention is less than the usual. I find that chambers 14 can conveniently converge rearwardly as shown in Fig. 3 or not converge rearwardly as shown in Figs. 1 and 2, as desired. I have found it convenient to construct turbine 12 with the planes of blades 22 at an angle of 45° from the plane of turbine 12, preferably at an angle of from 30° to 60° and so that blades 22 between points of tempered combustion gas contact will act as propellers to propel an aircraft in which the engines of my invention are mounted. The chamber 14 and turbine construction of my invention has been found to be more economical turbine and engine construction than that of the prior art while still giving desired direction to rearwardly moving exhaust fluids.

In operation compressed air from compressor 10 enters combustion chambers 14 through annular conduit 17 and such compressed air furnishes the oxygen for the burning of fuel in chambers 14 which is injected therein as desired. The resulting hot combustion gases exit from the rear of chambers 14 and pass through thrust augmenting members 16. Atmospheric air passes in through annulus 23 and such air in large quantities in relation to the combustion gases from chambers 14 is drawn in through annular openings 18 and the two gas streams contact and intimately mix, most desirably so that all gases exiting from rear members 16 to contact turbine blades 12 do so at substantially the same velocity. This is preferred and is what is efficiently accomplished by the thrust augmentation members 16 of my invention. The atmospheric air drawn in through openings 18 cools the exhaust gases from chambers 14 prior to contact with the turbine. Such air has its velocity increased, preferably continuously as it passes through members 16, and a pressure drop within members 16 is experienced. A decrease in velocity of the atmospheric air at any point in its passage through members 16 is desirably avoided, such being accomplished by designing to prevent increase of cross sectional flow area within members 16. Since the outside of members 16 is at atmospheric pressure and higher than the pressure inside created by exhaust due to the combustion gases, force is exerted on members 16 to propel an aircraft wherein the new jet engine of my invention is mounted. The series of converging inlets 18, through which air flows in to be mixed with the combustion gas stream, is very efficient and assures the desired increase of velocity of a large mass of atmospheric air to efficiently harness the kinetic energy of the propulsive jet and cool the combustion gases prior to contact with turbine blades 22. Good mixing is realized with no channeling of the combustion gas stream. In addition, during operation, a portion of the atmospheric air entering opening 23 passes between and around rear members 16 and contacts turbine 12, the blades 22 of which between rear members 16 function as propellers. The dual functioning turbine means of my invention is very advantageous and efficient. Good mixing to result in efficiently energizing atmospheric air is realized. Relatively smooth surfaces are desired for members 14, 16 and 19 and struts 20 and 21, so that a minimum of frictional loss will occur as the result of atmospheric air moving in through annular opening 23 and subsequently into the low pressure area within members 16 caused by the high velocity combustion gases exhausting the air within members 16.

The new thrust augmented jet engine of my invention can be used in any desired type of aircraft to power same. Preferably, engine 6 is mounted in commercial or military spotting and observation type aircraft where relatively low operational speeds and altitudes are employed, and wing, nose or tail section mount can be used as desired with housing or cowling 19 and auxiliary means provision for atmospheric air supply to the annular openings 18 formed by hollow frustum-like members 16 and combustion chambers 14, and by such members 16 alone. The new engine of my invention is highly efficient at commercial operational speeds and altitudes. The thrust augmented engine of my invention finds its greatest use in aircraft flown at speeds of from 125 to 500 miles per hour and at relatively low altitudes up to 25,000 feet.

As will be evident to those skilled in the art, various modifications of my invention can be made or followed in the light of this disclosure and discussion, without departing from the spirit or scope of the disclosure or from the scope of the claims.

I claim:

1. A thrust augmented jet propulsion engine comprising, in combination, an engine shaft, rotary compressor means mounted on said shaft in one end portion, turbine means mounted on said shaft in the opposite end portion, a plurality of stationary and elongated combustion chambers spaced from and disposed around said shaft between said compressor and said turbine, the longitudinal axis of said combustion chambers and said engine shaft are athwart, said combustion chambers having inlets connected to receive fluid from said compressor and outlets connected to discharge combustion gases into contact with the blades of said turbine, and, secured to each of said combustion chambers, a plurality of hollow, frusto-conoidal members co-axially connected together and mounted on the rear end portion thereof to encompass said rear end portion and receive said combustion gases, the first of said frusto-conoidal members mounted on each of said combustion chambers forming an annular fluid opening with each of said combustion chamber and extending and continually converging toward said turbine blades, each successive frusto-conoidal member forming an annular fluid opening with the frusto-conoidal member to which it is attached and extending and continually converging toward said turbine blades, and said frusto-conoidal members adapted to receive air through said annular openings, mix said air with combustion gases from said combustion chambers and pass a resulting mixture into contact with said turbine blades, thereby augmenting the thrust of said engine, and cowling means mounted around said combustion chambers, said frusto-conoidal members and said turbine, said cowling spaced from said combustion chambers and defining therewith an annulus for air passage, and said cowling and said frusto-conoidal members being positioned to provide air passageways to said turbine to allow passage of air to said turbine from said annulus during operation of said engine, and the planes of said turbine blades are at an angle of from 30° to 60° with the plane of said turbine and disposed to function as propeller blades in contact with air from said annulus between the outlets of the adjacent frusto-conoidal member assemblies.

2. A thrust augmented jet propulsion engine, comprising, in combination, an engine shaft, compressor means mounted to operate by power supplied by said shaft, turbine means mounted to rotate said shaft, a plurality of elongated combustion chambers spaced from and around said shaft and adapted to receive fluid from said compressor and to pass combustion gases toward the blades of said turbine, and secured to each of said combustion chambers between same and said turbine, a plurality of hollow frusto-conoidal members connected together in a line to encompass the rear end portion thereof and receive said combustion gases and to form with said combustion chambers and each other a plurality of annular fluid openings, each of said frusto-conoidal members continually converging rearwardly and adapted to receive air through said annular openings, mix said air with combustion gases from said combustion chambers and pass a resulting mixture into contact with the blades of said turbine, passageways communicating between the atmosphere externally of said engine and said turbine blades through said engine and bypassing said compressor adapted to conduct air therethrough into contact with said turbine blades, and said blades of said turbine being disposed on said turbine at an angle to the plane thereof and to said passageways to function as propeller blades during operation of said engine and in contact with air between the outlets of the adjacent frusto-conoidal member assemblies, thereby augmenting the thrust of said engine.

3. In a jet propulsion engine having, in combination, an engine shaft, compressor means mounted to operate by power supplied by said shaft, turbine means mounted to rotate said shaft, a combustion chamber adapted to receive fluid from said compressor and to pass combustion gases toward the blades of said turbine, a thrust augmentation means comprising, in combination, a hollow propulsive case mounted between said combustion chamber and said turbine and forming an annular opening with said combustion chamber, said propulsive case continually converging rearwardly of said combustion chamber, and a passageway through said engine communicating with the atmosphere and bypassing said compressor adapted to conduct air to said annular opening and to the blades of said turbine, said turbine blades being mounted on said turbine at an angle to the plane thereof and to said passageway to in operation function as a propeller in contact with air conducted thereto through said passageway.

4. A thrust augmented jet propulsion engine, comprising, in combination, an engine shaft, rotary compressor means mounted on said shaft in one end portion to turn therewith, turbine means mounted on said shaft in the opposite end portion to turn therewith, a plurality of combustion chambers disposed around said shaft between said compressor means and said turbine means, said combustion chambers having inlets to receive fluid from said compressor means and outlets to discharge combustion gases into contact with the blades of said turbine, and disposed between a plurality of said combustion chambers and said turbine means at least one hollow frusto-conoidal member per combustion chamber mounted base end portion to said combustion chambers to form annular fluid openings with said combustion chambers, to receive and pass through said combustion gases and extending and continually converging toward said turbine blades, and said frusto-conoidal members adapted to receive air through said annular openings, mix said air with combustion gases and pass a resulting mixture to said turbine blades, thereby augmenting the thrust of said engine and tempering said combustion gases, and cowling means mounted around said combustion chambers and said frusto-conoidal members to form an annular passageway for air to said frusto-conoidal members, said passageway bypassing said compressor and positioned to conduct air to said turbine blades, and said blades of said turbine being disposed on said turbine at an angle to the plane thereof and to said passageway to function as propeller blades during operation of said engine and in contact with air between the outlets of the adjacent frusto-conoidal members.

5. The engine of claim 1 wherein said combustion chambers converge rearwardly.

6. The engine of claim 2 wherein said frusto-conoidal member assemblies converge rearwardly and the longitudinal axis of said assemblies and said engine shaft are athwart.

References Cited in the file of this patent

UNITED STATES PATENTS

| | | |
|---|---|---|
| 1,375,601 | Morize | Apr. 17, 1921 |
| 2,346,178 | Mercier | Apr. 11, 1944 |
| 2,469,439 | Lundquist | May 10, 1949 |
| 2,563,745 | Price | Aug. 7, 1951 |
| 2,576,762 | Lawter | Nov. 27, 1951 |
| 2,632,299 | Loughran | Mar. 24, 1953 |
| 2,659,198 | Cook | Nov. 17, 1953 |

FOREIGN PATENTS

| | | |
|---|---|---|
| 545,647 | France | July 27, 1922 |